United States Patent
Vasseur et al.

(10) Patent No.: US 8,553,688 B2
(45) Date of Patent: Oct. 8, 2013

(54) DYNAMIC ALLOCATION OF CONTEXT IDENTIFIERS FOR HEADER COMPRESSION

(75) Inventors: Jean-Philippe Vasseur, Saint Martin d'Uriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 219 days.

(21) Appl. No.: 13/192,750

(22) Filed: Jul. 28, 2011

(65) Prior Publication Data

US 2013/0028095 A1  Jan. 31, 2013

(51) Int. Cl.
*H04L 12/28* (2006.01)
*H04J 1/16* (2006.01)

(52) U.S. Cl.
USPC ............ 370/389; 370/252; 370/254; 370/401

(58) Field of Classification Search
USPC ................... 370/252, 254, 389, 401
See application file for complete search history.

(56) References Cited

U.S. PATENT DOCUMENTS

| | | |
|---|---|---|
| 7,051,181 B2 | 5/2006 | Batcher |
| 7,221,684 B1 | 5/2007 | Smith et al. |
| 7,257,131 B2 | 8/2007 | Smith |
| 7,317,724 B2 | 1/2008 | Koren et al. |
| 7,460,516 B1 | 12/2008 | Smith et al. |
| 7,478,109 B1 | 1/2009 | Panigrahy et al. |
| 7,554,996 B2 | 6/2009 | Previdi et al. |
| 7,590,119 B2 | 9/2009 | Djernaes et al. |
| 7,602,778 B2 | 10/2009 | Guichard et al. |
| 7,633,854 B2 | 12/2009 | Saleh et al. |
| 7,969,983 B2 | 6/2011 | Guichard et al. |
| 7,978,708 B2 | 7/2011 | Filsfils et al. |
| 7,984,137 B2 | 7/2011 | O'Toole, Jr. et al. |
| 7,990,963 B1 * | 8/2011 | Aggarwal et al. ............. 370/390 |
| 2003/0179742 A1 * | 9/2003 | Ogier et al. .................... 370/351 |
| 2009/0003350 A1 | 1/2009 | Guichard et al. |

OTHER PUBLICATIONS

"RPL: IPv6 Routing Protocol for Low Power and Lossy Networks" <draft-ietf-roll-rpl-19> by Winter, at al. (Mar. 13, 2011 version).
"Compression Format for IPv6 Datagrams in Low Power and Lossy Networks (6LowPAN)" <draft-ietf-6lowpan-hc-15> by Hui et al. (Feb. 24, 2011 version).
Shelby, Z. et al., "Neighbor Discovery Optimization for Low Power and Lossy Networks (6LoWPAN)", draft-ietf-6lowpan-nd-17, IETF Working Group, Internet-Draft, Jun. 2011, 61 pages.

* cited by examiner

*Primary Examiner* — John Pezzlo
(74) *Attorney, Agent, or Firm* — Edwards Wildman Palmer LLP; James M. Behmke; Stephen D. LeBarron (57) ABSTRACT

In one embodiment, routable traffic through one or more border routers between a local computer network and a global computer network is monitored in order to characterize use of one or more global prefixes of the traffic. A particular set of the global prefixes, up to a maximum number, that are most frequently used may be mapped into a set of context identifiers (IDs) having a shorter bit-length than the global prefixes. The context IDs may then be distributed into the local computer network, and the one or more border routers convert between the context IDs and the global prefixes, accordingly.

24 Claims, 9 Drawing Sheets

TABLE 500

| FLOW/ PREFIX 505 | USAGE 510 | ALLOCATED CONTEXT ID 515 |
|---|---|---|
| Prefix "a" | 20 KB/S | - |
| Prefix "b" | 5 KB/S | - |
| Prefix "c" | 300 KB/S | "CID-A" |
| Prefix "d" | 10 KB/S | - |
| Prefix "e" | 210 KB/S | "CID-C" |
| Prefix "f" | 10 KB/S | - |
| ⋮ | ⋮ | ⋮ |

DYNAMIC ALLOCATION OF CONTEXT IDENTIFIERS FOR HEADER COMPRESSION

TECHNICAL FIELD

The present disclosure relates generally to computer networks, and, more particularly, to header compression in computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. To address the limited resources of LLNs, the Internet Engineering Task Force (IETF) working group for Internet Protocol version 6 (IPv6) over Low power Wireless Personal Area Networks (6LoWPAN) has defined an adaptation layer for carrying IPv6 packets in IEEE 802.15.4 frames. A primary component of the adaptation layer is an IPv6 header compression mechanism that reduces the size of IPv6 payloads to reduce channel utilization, transmission energy cost, and communication latency. Furthermore, because packet error rates and packet length are correlated, reduced packet sizes also serves to reduce packet error rates. Note that other LLN link technologies have also adopted the same (or similar) header compression mechanism, such as IEEE P1901.2 for Power Line Communication (PLC), and others.

The 6LoWPAN header compression mechanism reduces the size of IPv6 addresses by using stateless and context-based techniques. The stateless technique replaces the standard encoding for well-known address formats (e.g., link-local unicast, well-known multicast, and unspecified addresses) with compact forms used, and does not allow for communication across network boundaries. The context-based technique, however, may be used to compact IPv6 addresses by replacing them with a short context identifier that indicates a particular IPv6 prefix (e.g., limited to sixteen different 4-bit identifiers). This mechanism assumes that all 6LoWPAN devices in the same network are configured with the same context information, which requires extra configuration. Currently, however, there is no definition as to how prefixes are selected for compression into context identifiers, nor when context identifiers should be distributed.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, routable traffic through one or more border routers between a local computer network and a global computer network is monitored in order to characterize use of one or more global prefixes of the traffic. A particular set of the global prefixes, up to a maximum number, that are most frequently used may be mapped into a set of context identifiers (IDs) having a shorter bit-length than the global prefixes. The context IDs may then be distributed into the local computer network, and the one or more border routers convert between the context IDs and the global prefixes, accordingly.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

Figure 1:
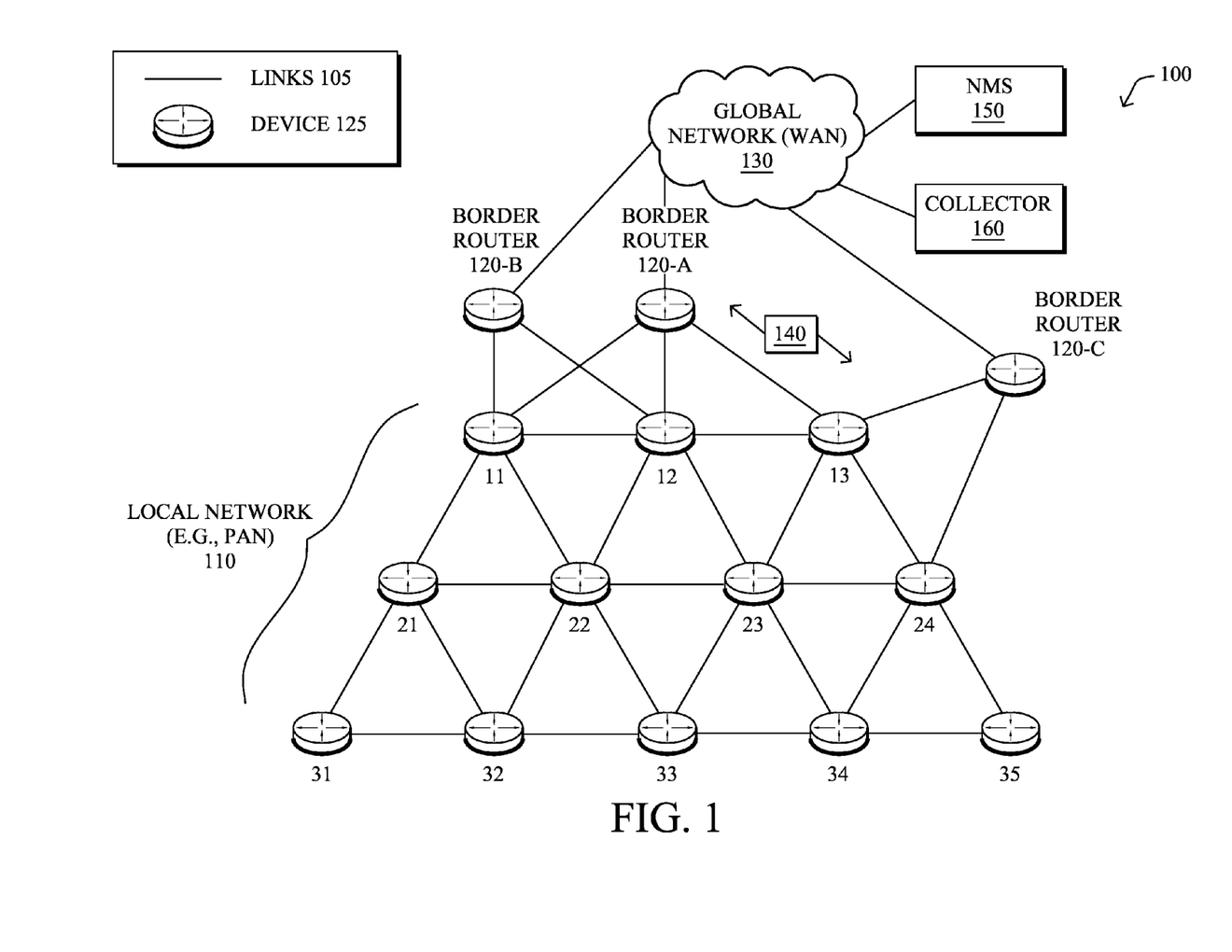
FIG. 1 illustrates an example computer network.

FIG. 1 is a schematic block diagram of an example computer network 100 illustratively comprising nodes/devices 125 (e.g., labeled as shown, "11," "12," . . . "35") interconnected by various methods of communication. For instance, the links 105 as shown may be shared media (e.g., wireless links, PLC links, etc.) of a mesh network, where certain nodes, such as, e.g., routers, sensors, computers, etc., may be in communication with other nodes, e.g., based on distance, signal strength, current operational status, location, etc. Generally, the devices 125 may be considered to be part of a "local" or mesh computer network 110 (e.g., a LAN or personal area network, "PAN"), which may be connected via one or more border routers 120 to a "global" computer network 130, such as a WAN. Within the global computer network, the mesh network 110 may be in communication with one or more network management servers 150, collectors 160, or other head-end applications or devices. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
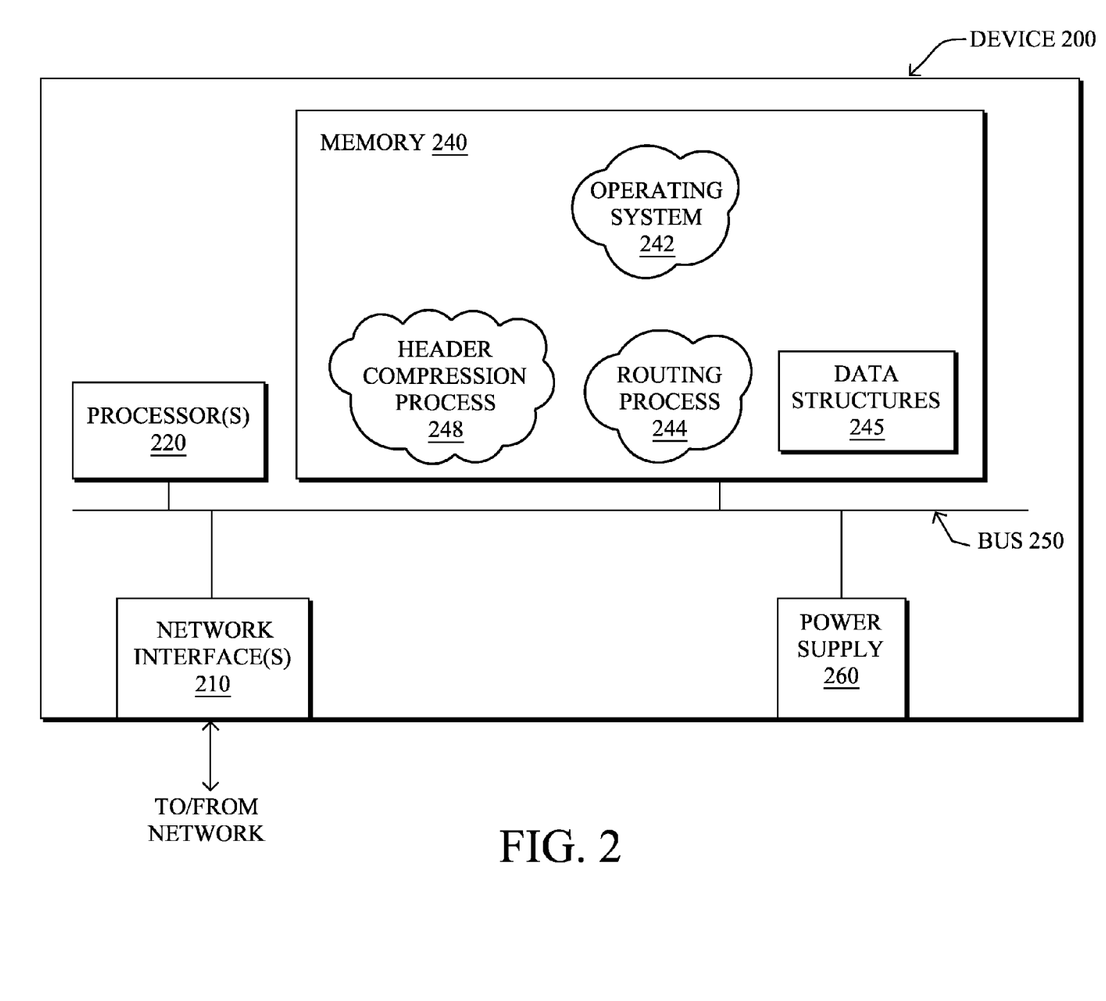
FIG. 2 illustrates an example network device/node.

FIG. 2 is a schematic block diagram of an example node/device 200 that may be used with one or more embodiments described herein, e.g., particularly as a border router 120 or other nodes where applicable. The device may comprise one or more network interfaces 210 (e.g., wireless, PLC, wired, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the local network 110 and when embodied as a border router 120, also into global network 130. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative "header compression" process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by routing process 244) based on an Objective Function (OF). The role of the Objective Function is generally to specify rules on how to build the DAG (e.g. number of parents, backup parents, etc.).

As noted above, to address the limited resources of LLNs, the IETF working group for IPv6 over Low power Wireless Personal Area Networks (6LoWPAN) has defined an adaptation layer for carrying IPv6 packets in IEEE 802.15.4 frames. A primary component of the adaptation layer is an IPv6 header compression mechanism that reduces the size of IPv6 payloads to reduce packet overhead, channel utilization, transmission energy cost, and communication latency. Furthermore, because packet error rates and packet length are correlated, reduced packet sizes also serves to reduce packet error rates. An illustrative header compression mechanism is specified in the IETF Internet Draft, entitled "RPL Compression Format for IPv6 Datagrams in Low Power and Lossy Networks (6LoWPAN)" <draft-ietf-6lowpan-hc-15> by Hui, at al. (Feb. 24, 2011 version). Note that other LLN link technologies have also adopted the same (or similar) header compression mechanism, such as IEEE P1901.2 for Power Line Communication (PLC), and others.

The 6LoWPAN header compression mechanism reduces the size of IPv6 addresses by using stateless and context-based techniques. The stateless technique replaces the standard encoding for well-known address formats (e.g., link-local unicast, well-known multicast, and unspecified addresses) with compact forms used, and does not allow for communication across network boundaries. The context-based technique, however, may be used to compact IPv6 addresses by replacing them with a short context identifier that indicates a particular IPv6 prefix (e.g., limited to sixteen different 4-bit identifiers). This mechanism assumes that all 6LoWPAN devices in the same network are configured with the same context information, which requires extra configuration. Currently, however, there is no definition as to how prefixes are selected for compression into context identifiers, nor when context identifiers should be distributed.

A number of LLN applications involve LLN devices communicating with a server outside the LLN, such as a network management service/server (NMS) 150. Also, for another example, in a Smart Grid AMI applications, Smart Meters communicate with a Collection Engine 160 to receive configuration information and report meter data. Because such communication relies on global IPv6 addresses, the proper context information can significantly increase overall system performance (e.g. throughput, latency, efficiency, etc.).

Figure 3:
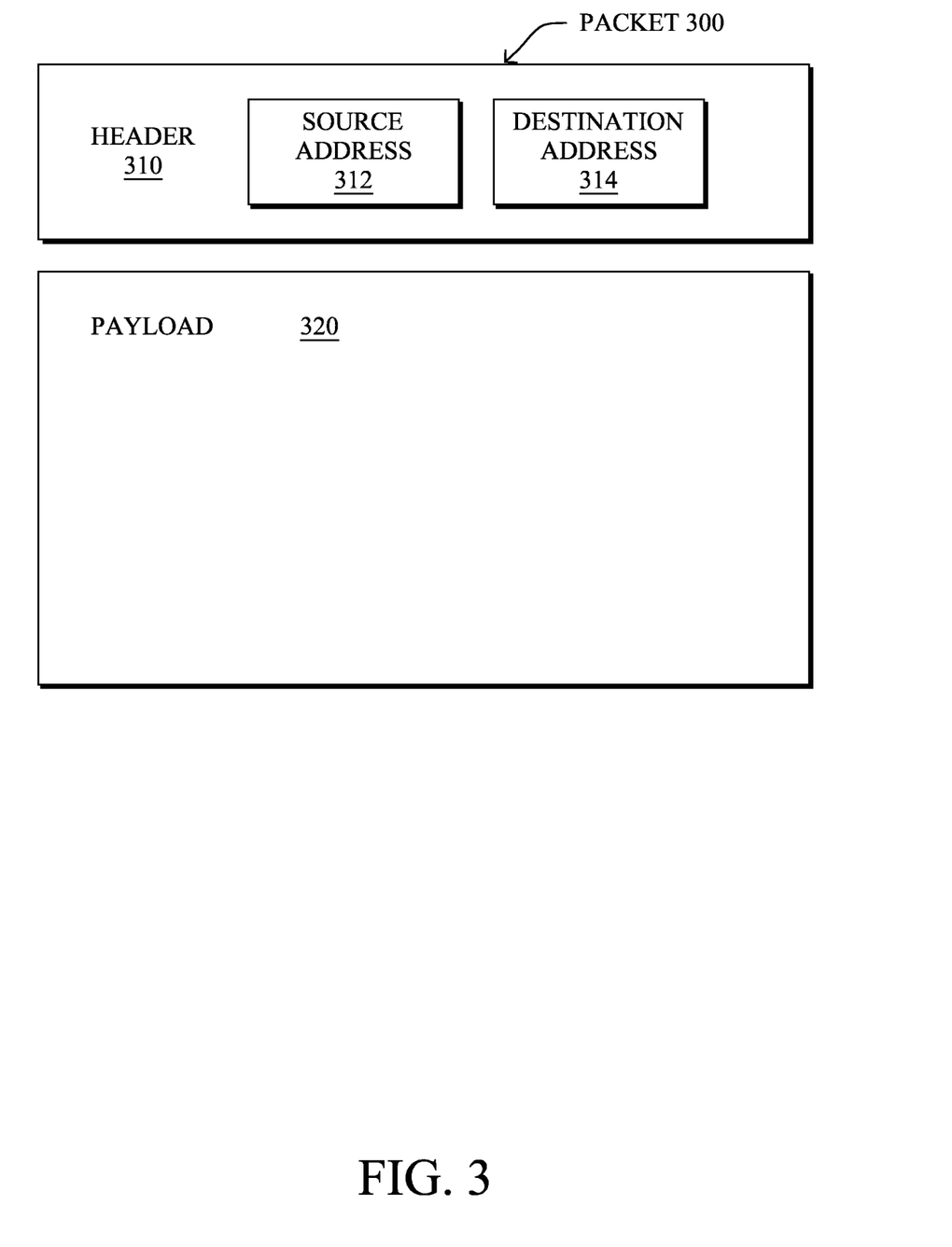
FIG. 3 illustrates an example packet.

For instance, with reference to FIG. 3, a packet 300 (e.g., 140) generally comprises one or more headers 310 for carrying various information used in transmitting the packet 300, such as a source address 312, a destination address 314, etc.

Figure 4:
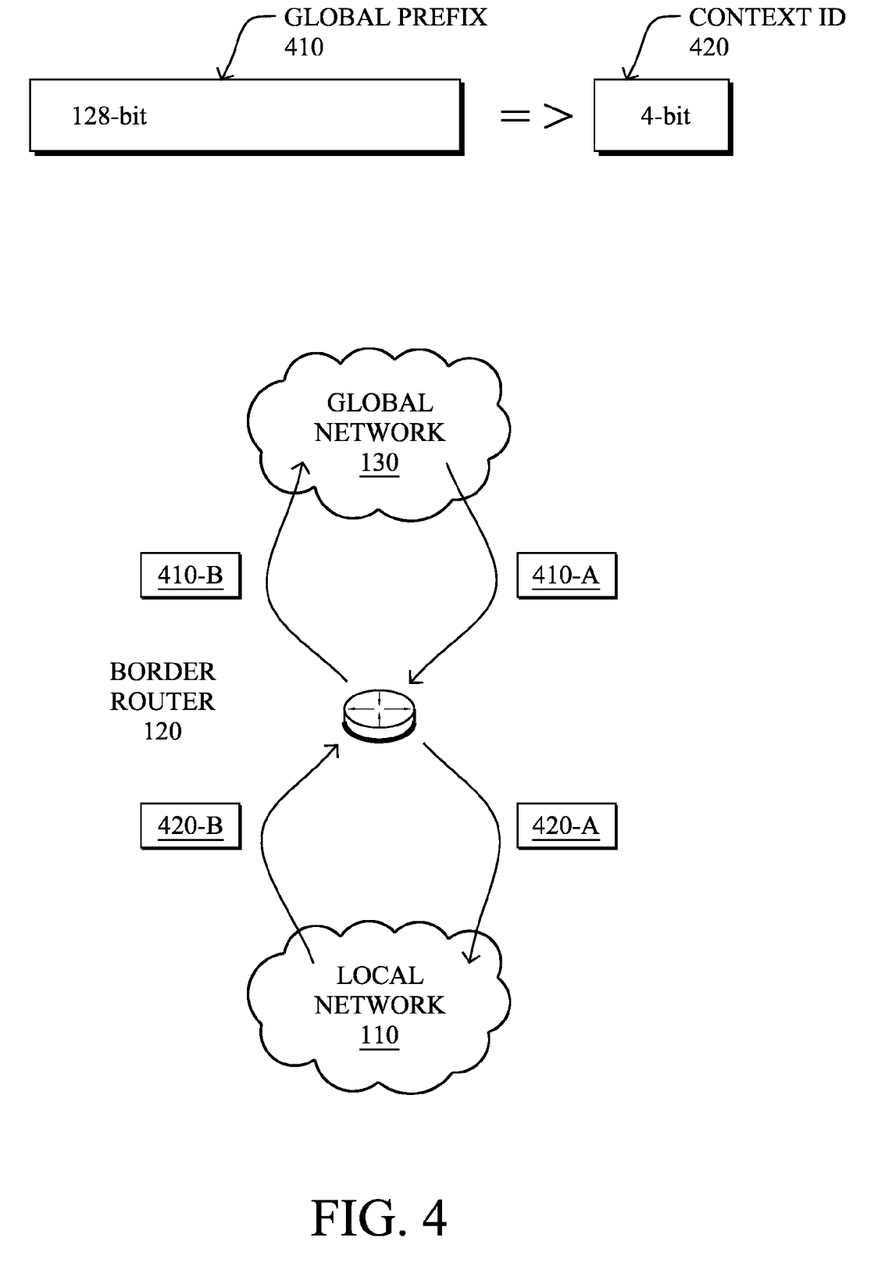
FIG. 4 illustrates an example of header compression and conversion.

The packet's payload 320 may then be directed through the network 100 based (generally) on the information container within the header. FIG. 4, on the other hand, illustrates how header compression may be used in a network, e.g., at a border router 120, by replacing the potentially long header 310 of the packet 300, particularly the destination address 314 (e.g., 128-bit IPv6 addresses), or generally "header 410," with a shorter context identifier (ID) 420 (e.g., a 4-bit 6LoWPAN Header Compression Context ID). Accordingly, as shown in FIG. 4, the context IDs 420 may be used within the local computer network 110, and converted to/from the full headers/addresses 410 by the border routers 120 based on their configured mapping (e.g., "410-A" to "420-A," and "420-B" to "410-B," etc.)

Because draft-ietf-6lowpan-hc only defines the encoding of IPv6 packets in IEEE 802.15.4 frames, however, the configuration of 6LoWPAN context information was left out-of-scope for that specification. Also, the IETF Internet Draft, entitled "Neighbor Discovery Optimization for Low Power and Lossy Networks (6LoWPAN)" <draft-ietf-6lowpan-nd-17> by Shelby, at al. (Jun. 13, 2011 version) specifies one method for distributing context information in a 6LoWPAN, but it does not describe how prefixes are selected or when context information should be distributed.

The techniques described below, therefore, dynamically updates the 6LoWPAN context information to maximize the benefit of 6LoWPAN header compression mechanisms. The techniques below also specify a mechanism that auto-configures prefixes so that no manual configuration or administration is required, which is substantially important in typical LLN environments.

Dynamic Allocation of Context Identifiers

The techniques herein introduce the concept of dynamically auto-configuring context information (e.g., 6LoWPAN context information) for use with header compression (e.g., IPv6 header compression). In particular, according to one or more embodiments of the disclosure as described in detail below, routable traffic (thus using global addresses) through one or more border routers between a local computer network and a global computer network is monitored in order to characterize use of one or more global prefixes of the traffic. A particular set of the global prefixes, up to a maximum number, that are most frequently used may be mapped into a set of context identifiers (IDs) having a shorter bit-length than the global prefixes. The context IDs may then be distributed into the local computer network, and the one or more border routers convert between the context IDs and the global prefixes, accordingly.

Illustratively, the techniques described herein may be performed by hardware, software, and/or firmware, such as in accordance with the header compression process 248, which may contain computer executable instructions executed by the processor 220 to perform functions relating to the novel techniques described herein, e.g., in conjunction with routing process 244. For example, the techniques herein may be treated as extensions to conventional protocols, such as the various 6LoWPAN protocols, and as such, may be processed by similar components understood in the art that execute those protocols, accordingly.

Operationally, the techniques herein may first be described with relation to determining the appropriate context information, i.e., the context IDs 420. In many LLN applications, routable traffic generally flows through one or a small handful of LLN Border Routers (LBRs) 120 that connect the LLN 110 to the outside IP world (global network 130). For example, in a Smart Grid AMI application, Smart Meter applications generally communicate with a Collection Engine 160 hosted outside the LLN. LLN devices also communicate any management information to a Network Management System (NMS) 150 hosted outside the LLN. Furthermore, when using the RPL protocol, in a "non-storing mode," all routable traffic must flow through the RPL DAG root, which is typically implemented on the LBRs.

Figure 5:
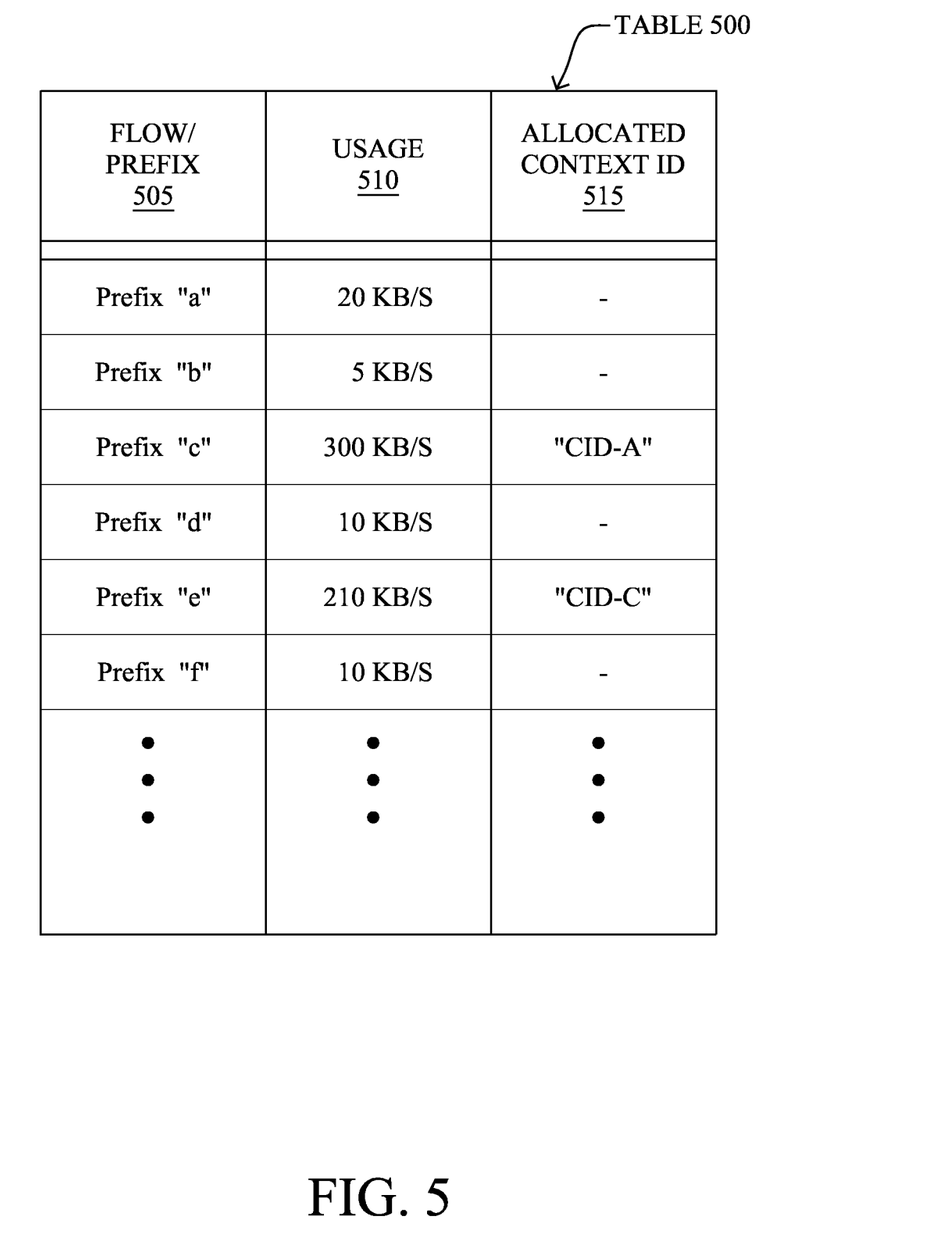
FIG. 5 illustrates an example characterization table and header compression mapping.

Because the LBRs 120 can monitor routable traffic that is sourced by and/or destined to devices in the LLN (i.e., the traffic of interest traverses through the border routers 120), the LBRs can characterize the use of global prefixes 410 within that traffic, using various packet inspection techniques. FIG. 5 illustrates an example table 500 (e.g., a data structure 245) that may be used to store the appropriate information gathered by monitoring and characterizing the traffic. For instance, a flow/prefix field 505 may list the most recent set of global prefixes 410 monitored (e.g., "a" through "f" shown), and an associated "usage" field 510 may characterize the usage, such as a number of times the prefix is seen, a rate at which the prefix is seen (for example, as a portion/percentage of a total data rate, or else as an approximate number, e.g., 20 kB/s). Note that the format of table 500 is merely for illustration, and is not meant to limit the scope of the embodiments herein. (Note also that an allocated context ID field 515 is described below.)

Note that there may be network configurations where there are a plurality of border routers between the local and global computer networks, and as such, use of the global prefixes should be characterized based on monitoring the traffic through the plurality of border routers. For instance, the LBRs can then combine their results to characterize the use of prefixes across the entire 6LoWPAN (remember that 6LoW-PAN header compression requires all devices to be configured with the same context information). The process of combining results can be done in different ways:
1) Select a single LBR as a "leader" or "primary border router" and have all other LBRs serving the same local network 110 (e.g., the same 6LoWPAN) to report their prefix information to the leader. The leader then dictates the context information as described herein (e.g., determining most frequently used global prefixes, and mapping and distributing context IDs, etc.).
2) Have each LBR report their prefix information to all other LBRs. After receiving prefix information from all other LBRs, have each LBR use a deterministic function common to all LBRs to compute the prefix mapping information.

A variety of algorithms may be used to determine a mapping between context IDs 420 and global prefixes 410. For instance, a first example method may use any of a variety of known frequency-counting algorithms (e.g., Misra-Gries) for determining the top most frequently used global prefixes (e.g., the top sixteen). According to a second example method, the problem can be viewed as an adaptive Huffman coding problem (as will be understood by those skilled in the art), where each code must be 4-bits long. One can use any adaptive Huffman coding algorithm (e.g., "FGK" or "Vitter") to assign 4-bit codes (context IDs 420) to global prefixes 410. One advantage of using Huffman coding is that it more naturally deals with commonly-used prefixes that fully contain other commonly-used prefixes (e.g., a /64 that matches a /48). As further shown in FIG. 5 is an illustrative mapping of the allocated context IDs as defined in allocation field 515 (e.g., "CID-A," "CID-C," etc.).

Illustratively, the frequency calculation, that is, the characterization of prefix usage, should occur over a sliding window such that it adapts to changes in frequency over time in order to remap the context IDs after a length of time.

Note that while one illustrative embodiment maps 6LoW-PAN 4-bit header compression context IDs 4420 to IPv6 global prefix addresses 410, other mappings between context IDs and global prefixes may be used. For instance, the number of global prefixes that can be mapped to context IDs need not be limited to sixteen (4-bits), as in the current 6LoWPAN header compression specification, but larger or smaller numbers may be supported, such that once this number is determined, a particular set of global prefixes may be determined (e.g., and mapped) that are most frequently used, up to that specific allowable number (i.e., as many different context IDs as are available). In one embodiment, it is also possible to allow the border routers to dynamically increase and/or decrease the number of available context IDs (e.g., increasing the bit-length of the context ID) as needed.

Note also that another alternative to the embodiments above consists of having each border router/LBR 120 making a association between a prefix and a context ID, and sharing this association with other LBRs (thus without requiring each LBR to use a common algorithm). In this instance, any conflicts between the respective context IDs from each border router may be resolved in a variety of manners. For instance, context collisions can be sorted out by releasing the context ID giving precedence to the LBR with the higher IP address, or a specifically assigned preference, etc.

In addition, in one embodiment, a "bidding" mechanism may be used between LBRs in case of context ID shortage (supposing that all available context IDs have been used). In particular, if a border router wishes to allocate a context ID for a newly identified flow of heavy traffic, the border router may send a message to other border routers reporting the averaged traffic rates for its lowest flow and the new flow. Upon receiving that message, other border routers may trigger the same advertisement for their context IDs. Once all border routers have received the information, a distributed algorithm can be used so that each border router determines which one must release a context ID for the requester. As an example, assume the following:
Border Router 120-A:
  lowest flow is 20 KBits/s CID=3;
  higher flow is 130 KBits/s CID=5;
Border Router 120-B:
  lowest flow is 24 KBits/s CID=6;
  higher flow is 230 KBits/s CID=7;
Border Router 120-C:
  lowest flow is 30 KBits/s CID=13;
  higher flow is 130 KBits/s CID=15.
If a border router then detects a new flow with an average rate of 500 KBits/s, and there are no more context IDs available, the algorithm described above may be invoked, and Border Router 120-A would have to relinquish the mapped context ID "CID=3," as it has a lowest frequency of use among the plurality of border routers.

According to one or more embodiments of the disclosure herein, techniques are also described for distributing the context information allocated above. In particular, border routers 120 may distribute context information to the nodes in the local computer network 110 in several ways in order to establish the network operation by the nodes 125, and thus be able to convert between the context IDs 420 and the global prefixes 410 at the border routers 120 (e.g., as shown in FIG. 4 above).

The current specification of draft-ietf-6lowpan-nd mentioned above uses a flooding-based protocol to distribute 6LoWPAN context information. The downside of using this mechanism is that it is a completely independent protocol and may add significant overhead to the 6LoWPAN network.

Figure 6A:
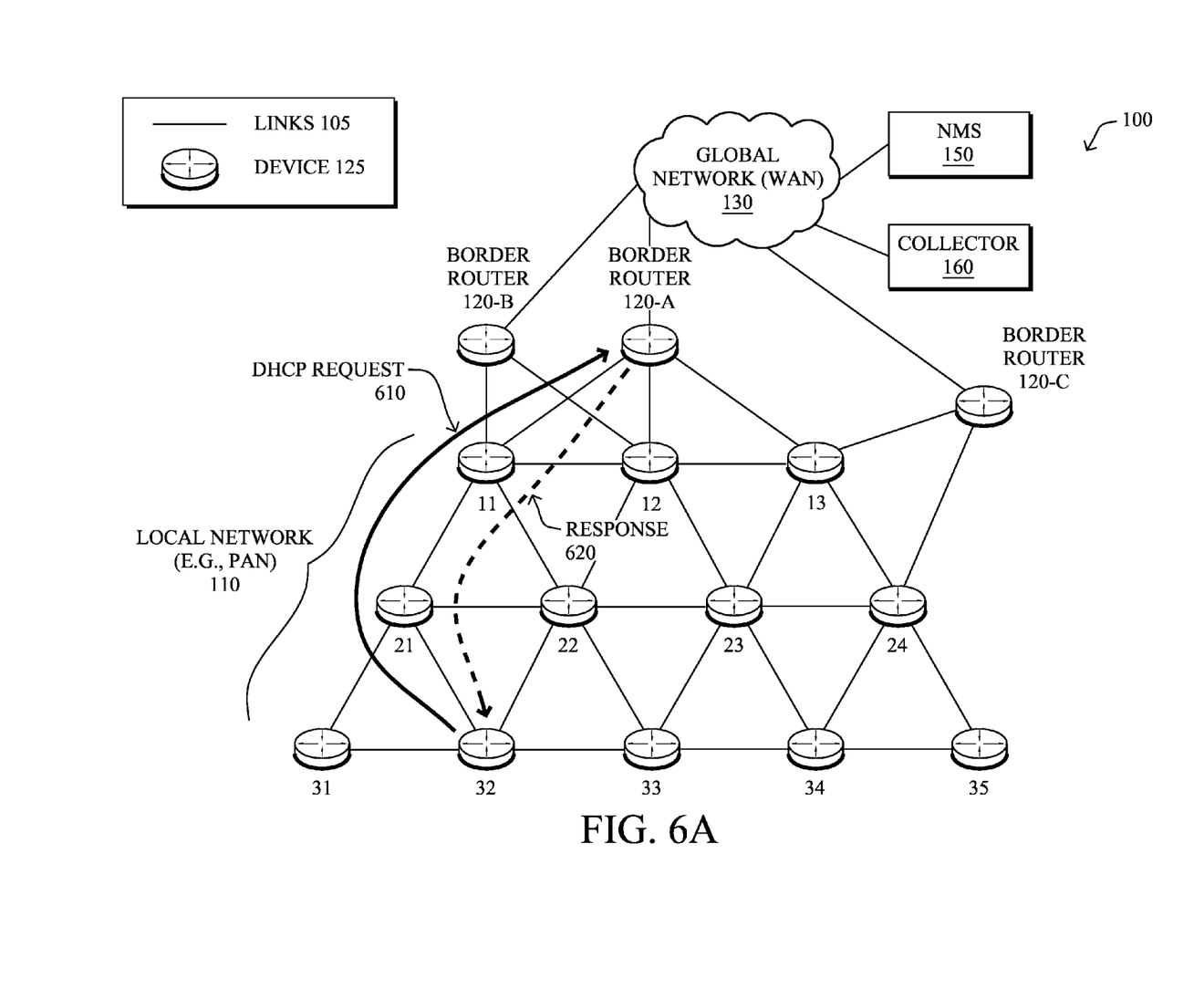
FIGS. 6A-6B illustrate examples of context identifier distribution into the computer network.

Accordingly, two alternative mechanisms, each an application-specific choice based on respective tradeoffs, are proposed herein:

1) Relaying the context IDs 420 (their mapping) within dynamic host configuration protocol (DHCP) messages within the local computer network 110, for example, using DHCP for IPv6 (DHCPv6) to distribute context information in a newly defined DHCPv6 option. As shown in FIG. 6A, by using a DHCP server (e.g., located on a border router 120), devices can retrieve new configuration information in addition to the header compression context information (e.g., request/reply exchange 610/615).

Figure 6B:
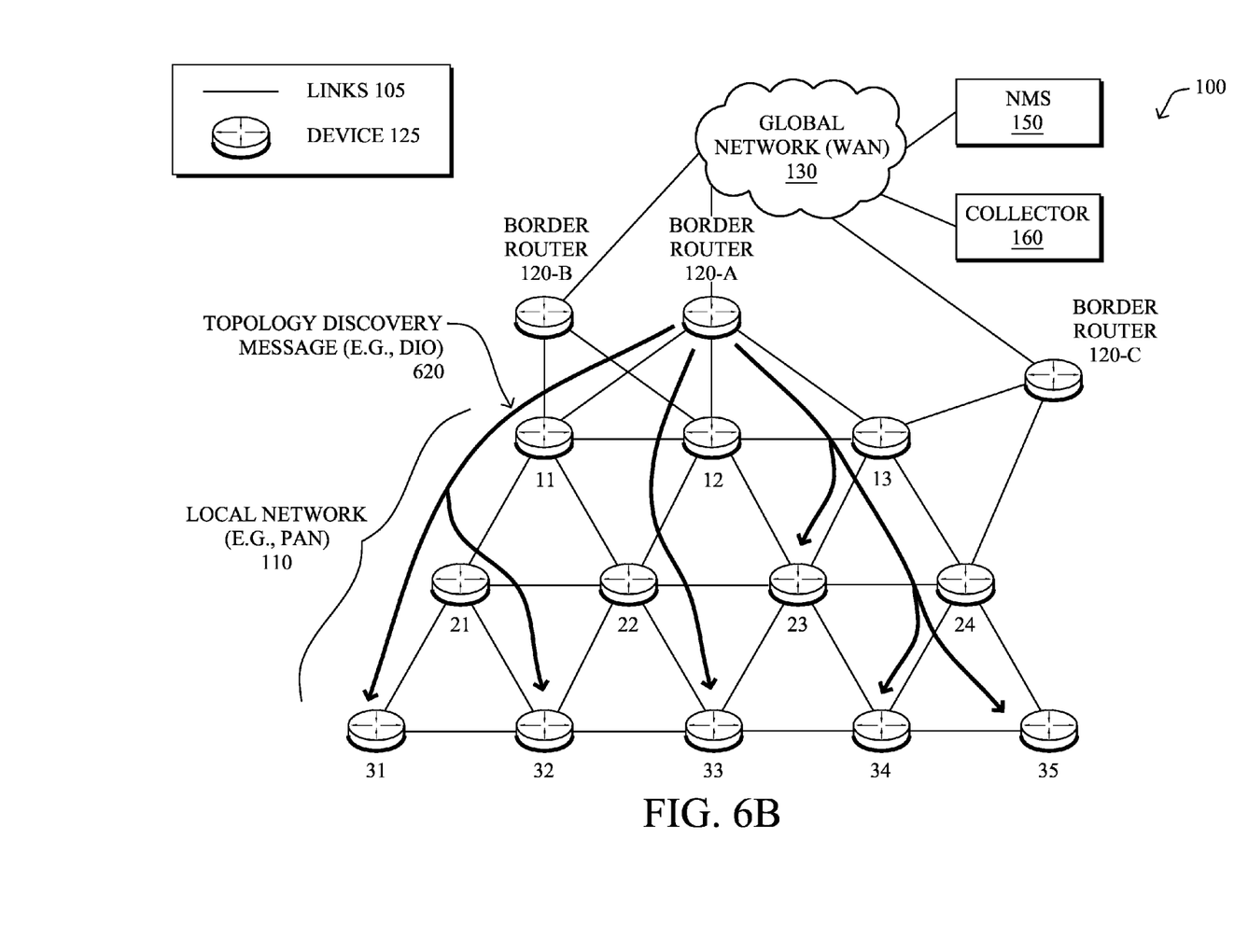

2) "Piggybacking" the context IDs (their mapping) within network topology discovery messages distributed within the local computer network, for example, through defining a new option in RPL that may be included in RPL "DIO" messages (a DODAG Information Object, or DIO, is a type of DAG discovery message that carries information that allows a node to discover a RPL Instance, learn its configuration parameters, select a DODAG parent set, and maintain the upward routing topology). By piggybacking on RPL DIO messages, as shown in FIG. 6B (topology discovery messages 620), the same (e.g., Trickle-based) dissemination mechanism used to distribute route updates can be utilized.

Note that in certain embodiments, it may not make sense to utilize all context IDs if the added benefits of having the context information in place does not justify the cost of distributing context information. According to a specific embodiment, therefore, each border router has the option to disable the use of a context ID if its frequency of use does not justify the cost of maintaining the context information. Because all of the border routers in the local network may have to communicate the context information periodically or when new nodes join the network, there is a continuous cost to maintaining the context information. Accordingly, when a border router determines that the maintenance cost of a particular context ID, e.g., in terms of traffic, memory, etc., exceeds the benefit, it disables its use of the context ID, and informs the network that the context ID has been freed up/relinquished (e.g., in the case of RPL, a DIO message may be sent). Such message may also be sent if a border router receives a packet with an unknown context ID, which may be because the message advertising that the context ID is no longer used or has been lost.

Figure 7A:
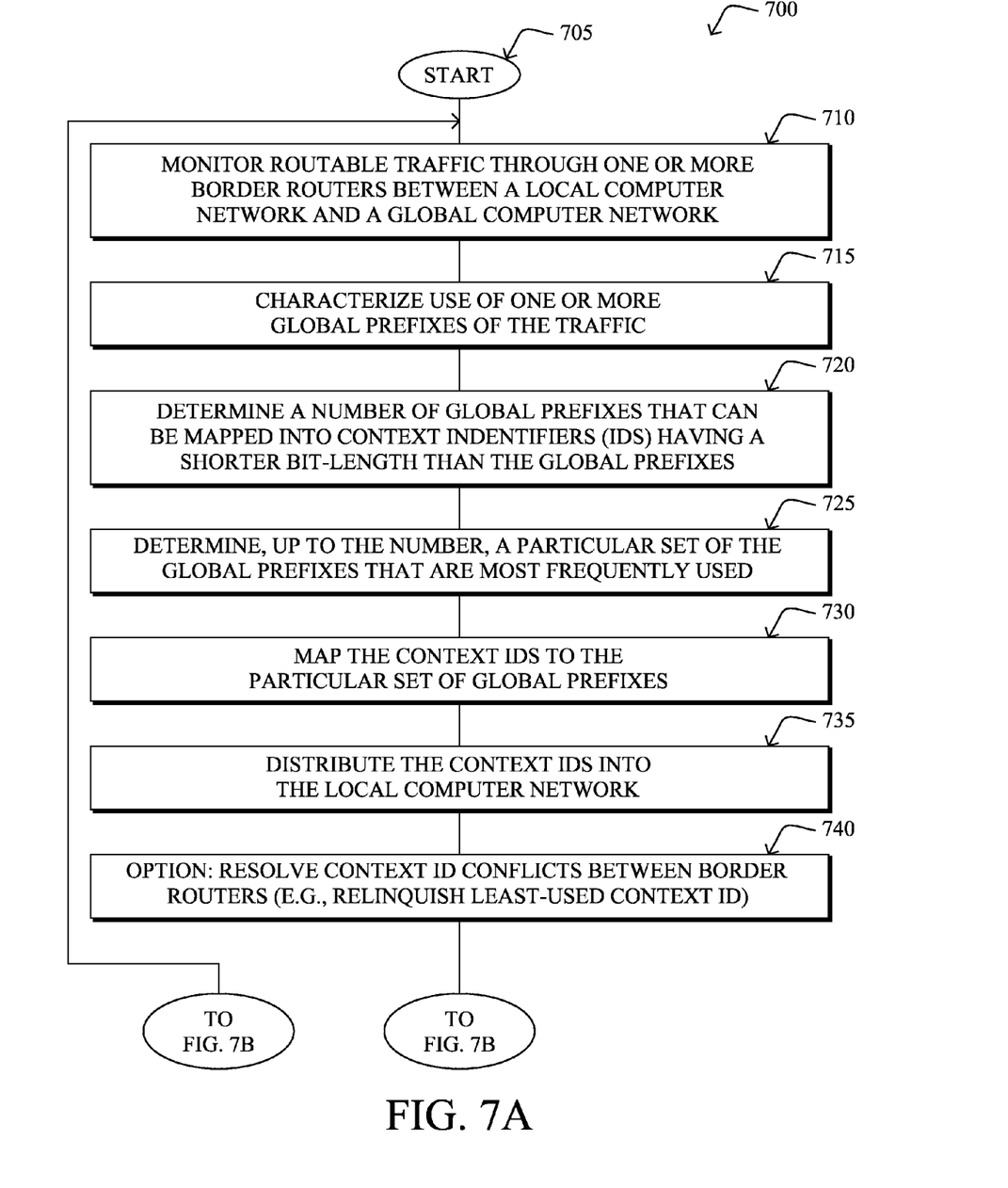
FIGS. 7A-7B illustrate an example simplified procedure for dynamically allocating context identifiers for header compression in a computer network.
Figure 7B:
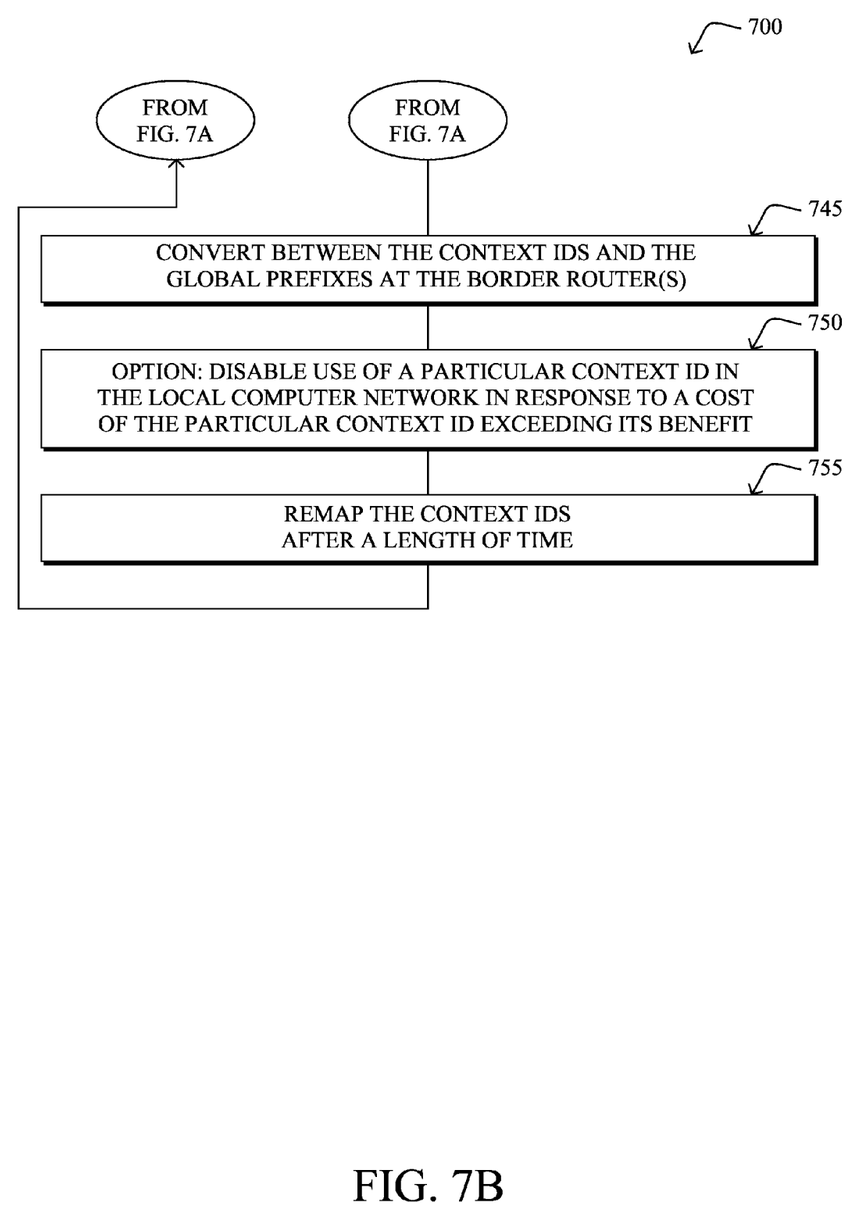

FIGS. 7A-7B illustrate an example simplified procedure for dynamically allocating context identifiers for header compression in a computer network in accordance with one or more embodiments described herein. The procedure 700 starts at step 705, and continues to step 710, where, as described in greater detail above, routable traffic through one or more border routers 120 between a local computer network 110 and a global computer network 130 is monitored, and the use of one or more global prefixes 410 of the traffic (e.g., flows 505 and usage 510) may be characterized in step 715.

Once the number of global prefixes that can be mapped into context IDs is determined (step 720, or else statically configured), then in step 725 a particular set of the global prefixes 410 that are most frequently used can be determined, up to that number, and context IDs 420 may then be mapped to the particular set of global prefixes in step 730, as described in detail above. In particular, the monitoring, mapping, etc., may be performed by one or more border routers according to the techniques outlined above. In step 735, the context IDs 420 may be distributed into the local computer network 110, e.g., through DHCP configuration (request/reply 610/615) or topology discovery messages 620. Note that in the event there is a conflict between context IDs of different border routers (when individually computed), in step 740 the conflict may be resolved according to one or more techniques mentioned above (e.g., relinquishing a least-used context ID, etc.).

Operation of the border router(s) with regard to traffic flow proceeds in step 745, where the one or more border routers convert between the context IDs 420 and the mapped global prefixes 410. Note that as mentioned above, in step 750 the use of a particular context ID in the local computer network may be disabled in response to a cost of the particular context ID exceeding its benefit.

The procedure 700 proceeds to step 755, where the context IDs may be remapped after a certain length of time, or else may be continuously updated, by returning to step 710 to continue monitoring the traffic, characterizing the traffic, etc. If new context IDs are needed, they may be distributed into the network, or if there are no available context IDs, old mapped IDs may be replaced, and so on.

It should be noted that while certain steps within procedure 700 may be optional as described above, the steps shown in FIGS. 7A-7B are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The novel techniques described herein, therefore, dynamically allocate context identifiers for header compression in a computer network. In particular, by maximizing the benefit of header compression (e.g., 6LoWPAN header compression), the techniques herein reduce packet control plane overhead, channel utilization, reduce latency, increase throughput, reduce packet-error rates, and reduce transmission costs.

While there have been shown and described illustrative embodiments that dynamically allocate context identifiers for header compression in a computer network, it is to be understood that various other adaptations and modifications may be made within the spirit and scope of the embodiments herein. For example, the embodiments have been shown and described herein with relation specifically to 6LoWPAN and IPv6 protocols. However, the embodiments in their broader sense are not as limited, and may, in fact, be used with other types of protocols. In addition, while the network (local computer network) is shown as an LLN, other types of networks may utilize the techniques herein where a border router communicates between two different networks.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
monitoring routable traffic through a border router between a local computer network and a global computer network;

characterizing use of one or more global prefixes of the traffic;

determining a number of global prefixes that can be mapped into context identifiers (IDs) having a shorter bit-length than the global prefixes;

determining, up to the number, a particular set of the global prefixes that are most frequently used;

mapping the context IDs to the particular set of global prefixes;

distributing the context IDs into the local computer network; and converting between the context IDs and the global prefixes at the border router.

2. The method as in claim 1, wherein there are a plurality of border routers between the local and global computer networks; the method further comprising:

characterizing use of one or more global prefixes of the traffic based on monitoring the traffic through the plurality of border routers.

3. The method as in claim 2, further comprising:

determining, by a primary border router of the plurality of border routers, the particular set of the global prefixes that are most frequently used based on the traffic through the plurality of border routers;

mapping, by the primary border router, the context IDs to the particular set of global prefixes;

distributing the context IDs from the primary border router into the local computer network; and converting between the context IDs and the global prefixes at the plurality of border routers.

4. The method as in claim 2, further comprising:

determining, by each border router of the plurality of borders via a deterministic function shared by the plurality of border routers, the particular set of the global prefixes that are most frequently used based on the traffic through the plurality of border routers;

mapping the context IDs to the particular set of global prefixes using the deterministic function;

distributing the context IDs from the plurality of border routers into the local computer network; and converting between the context IDs and the global prefixes at the plurality of border routers.

5. The method as in claim 1, wherein there are a plurality of border routers between the local and global computer networks; the method further comprising:

determining, by each border router of the plurality of border routers, a respective set of the global prefixes that are most frequently used through the corresponding border router;

mapping, by each border router, respective context IDs to the respective set of global prefixes;

distributing the respective context IDs from each border router into the local computer network; and resolving any conflicts between the respective context IDs from each border router.

6. The method as in claim 5, wherein resolving a particular conflict comprises:

relinquishing a mapped context ID having a lowest frequency of use among the plurality of border routers.

7. The method as in claim 1, further comprising:

disabling use of a particular context ID in the local computer network in response to a cost of the particular context ID exceeding its benefit.

8. The method as in claim 1, further comprising:

remapping the context IDs after a length of time.

9. The method as in claim 1, wherein global prefixes comprise Internet Protocol version 6 (IPv6) addresses.

10. The method as in claim 9, wherein context IDs comprise IPv6 over Low power Wireless Personal Area Networks (6LoWPAN) context IDs.

11. The method as in claim 1, wherein characterizing the use of the one or more global prefixes of the traffic and determining the particular set of the global prefixes that are most frequently used comprises an algorithm selected from a group consisting of a frequency-counting algorithm and a Huffman coding algorithm.

12. The method as in claim 1, wherein distributing the context IDs into the local computer network comprises:

piggybacking the context IDs within network topology discovery messages distributed within the local computer network.

13. The method as in claim 1, wherein distributing the context IDs into the local computer network comprises:

relaying the context IDs within dynamic host configuration protocol (DHCP) messages within the local computer network.

14. The method as in claim 1, further comprising:

adjusting the number of global prefixes that can be mapped into context IDs.

15. An apparatus, comprising:

one or more network interfaces to communicate as a border router between a local computer network and a global computer network;

a processor coupled to the network interfaces and adapted to execute one or more processes; and a memory configured to store a border router process executable by the processor, the process when executed operable to:

monitor routable traffic through the border router between the local computer and the global computer network;

characterize use of one or more global prefixes of the traffic;

determine a number of global prefixes that can be mapped into context identifiers (IDs) having a shorter bit-length than the global prefixes;

determine, up to the number, a particular set of the global prefixes that are most frequently used;

map the context IDs to the particular set of global prefixes;

distribute the context IDs into the local computer network; and convert between the context IDs and the global prefixes at the border router.

16. The apparatus as in claim 15, wherein there are a plurality of border routers between the local and global computer networks, and wherein the process when executed is further operable to:

characterize use of one or more global prefixes of the traffic based on shared knowledge of the traffic through the plurality of border routers.

17. The apparatus as in claim 16, wherein the process when executed is further operable to:

determine, as a primary border router of the plurality of border routers, the particular set of the global prefixes that are most frequently used based on the traffic through the plurality of border routers;

map, by the primary border router, the context IDs to the particular set of global prefixes; and distribute the context IDs from the primary border router into the local computer network, wherein the plurality of border routers are configured to convert between the context IDs and the global prefixes.

18. The apparatus as in claim 16, wherein the process when executed is further operable to:
  determine, via a deterministic function shared by the plurality of border routers, the particular set of the global prefixes that are most frequently used based on the traffic through the plurality of border routers; and
  map the context IDs to the particular set of global prefixes using the deterministic function.

19. The apparatus as in claim 15, wherein there are a plurality of border routers between the local and global computer networks, and wherein the process when executed is further operable to:
  resolve any conflicts between the mapped context IDs and other mapped context IDs from other border routers of the plurality of border routers.

20. The apparatus as in claim 19, wherein the process when executed to resolve a particular conflict is further operable to:
  relinquish a mapped context ID having a lowest frequency of use among the plurality of border routers.

21. The apparatus as in claim 15, wherein the process when executed is further operable to:
  remap the context IDs after a length of time.

22. The apparatus as in claim 15, wherein the process when executed to distribute the context IDs into the local computer network is further operable to one of either:
  piggyback the context IDs within network topology discovery messages distributed within the local computer network; and
  relaying the context IDs within dynamic host configuration protocol (DHCP) messages within the local computer network.

23. The apparatus as in claim 15, wherein the process when executed is further operable to:
  adjust the number of global prefixes that can be mapped into context IDs.

24. A tangible, non-transitory, computer-readable media having software encoded thereon, the software when executed by a processor operable to:
  monitor routable traffic through a border router between a local computer network and a global computer network;
  characterize use of one or more global prefixes of the traffic;
  determine a number of global prefixes that can be mapped into context identifiers (IDs) having a shorter bit-length than the global prefixes;
  determine, up to the number, a particular set of the global prefixes that are most frequently used;
  map the context IDs to the particular set of global prefixes;
  distribute the context IDs into the local computer network; and
  convert between the context IDs and the global prefixes.

* * * * *